(12) United States Patent
Sivertsen et al.

(10) Patent No.: US 11,482,824 B2
(45) Date of Patent: Oct. 25, 2022

(54) APPARATUS FOR HOLDING A WORKPIECE TO BE CRIMPED AND TOOLS COMPRISING SUCH AN APPARATUS

(71) Applicant: PRESSMASTER AB, Alvdalen (SE)

(72) Inventors: Otto Sivertsen, Orsa (SE); Marco Endler, Alvdalen (SE)

(73) Assignee: Pressmaster AB, Alvdalen (SE)

( * ) Notice: Subject to any disclaimer, the term of this patent is extended or adjusted under 35 U.S.C. 154(b) by 470 days.

(21) Appl. No.: 16/629,067

(22) PCT Filed: Jul. 2, 2018

(86) PCT No.: PCT/SE2018/050718
§ 371 (c)(1),
(2) Date: Jan. 7, 2020

(87) PCT Pub. No.: WO2019/013687
PCT Pub. Date: Jan. 17, 2019

(65) Prior Publication Data
US 2020/0176939 A1 Jun. 4, 2020

(30) Foreign Application Priority Data
Jul. 10, 2017 (SE) .................................. 1750907-6

(51) Int. Cl.
*H01R 43/042* (2006.01)
*H02G 15/02* (2006.01)

(52) U.S. Cl.
CPC .......... *H01R 43/042* (2013.01); *H02G 15/02* (2013.01); *Y10T 29/53226* (2015.01)

(58) Field of Classification Search
CPC .............. H01R 43/042; H01R 43/0421; H01R 43/045; H01R 43/048; H01R 43/0482;
(Continued)

(56) References Cited

U.S. PATENT DOCUMENTS 3,059,511 A 10/1962 Morris
3,091,276 A 5/1963 Aquillon
(Continued)

FOREIGN PATENT DOCUMENTS

| DE | 92 13 529 | 12/1992 |
| DE | 20 2010 008 988 | 2/2012 |
| FR | 2 658 006 | 8/1991 |

*Primary Examiner* — Peter Dungba Vo
*Assistant Examiner* — Joshua D Anderson
(74) *Attorney, Agent, or Firm* — Mark P. Stone

(57) ABSTRACT

An apparatus (102) for holding at least one elongated workpiece (106) to be crimped, wherein the apparatus comprises a holder frame (122), a guide member (124) and a locator element (114) having at least one holder surface (116) defining an elongated cavity (118) for receiving and holding the workpiece. The holder frame is arranged to hold the guide member and the locator element, the at least one elongated cavity having a longitudinal main extension (120). The locator element is movable in a first guide (126) in the direction (127) of the longitudinal main extension. The guide member is movable in a second guide (128) in relation to the locator element in a direction (129) perpendicular to the direction (127) of the longitudinal main extension. The guide member and the locator element are slidably engaged with one another. The guide member, when being moved in a direction (129) perpendicular to the direction (127) of the longitudinal main extension, is configured to move the locator element in the direction (127) of the longitudinal main extension. A crimping tool (170) comprising such an apparatus (102).

20 Claims, 7 Drawing Sheets

(58) Field of Classification Search
CPC ............ H01R 43/055; Y10T 29/49181; Y10T 29/49183; Y10T 29/49185; Y10T 29/53222; Y10T 29/53226; Y10T 29/53235; B25B 27/146
See application file for complete search history.

(56) References Cited

U.S. PATENT DOCUMENTS

| | | | |
|---|---|---|---|
| 3,281,926 A | | 11/1966 | Frastaci et al. |
| 3,710,611 A | | 1/1973 | Filia |
| 4,754,636 A | | 7/1988 | Kautz et al. |
| 4,982,594 A | | 1/1991 | Wiebe |
| 5,175,925 A | | 1/1993 | Grosklos et al. |
| 5,212,978 A | * | 5/1993 | Liu ...................... H01R 43/042 72/461 |
| 5,924,322 A | | 7/1999 | Caveney |
| 2012/0144893 A1 | | 6/2012 | Battenfeld |
| 2014/0115890 A1 | * | 5/2014 | Jonasson .............. H01R 43/048 29/863 |

* cited by examiner

APPARATUS FOR HOLDING A WORKPIECE TO BE CRIMPED AND TOOLS COMPRISING SUCH AN APPARATUS

TECHNICAL FIELD

Aspects of the present invention relate to an apparatus for holding at least one elongated workpiece to be crimped, and to a crimping tool comprising such an apparatus.

BACKGROUND OF THE INVENTION

Cable termination tooling, e.g. hand-operated or machine-operated tools, may comprise cutting tools, stripping tools and crimping tools. Some tools have only one of the above-mentioned functions, whereas other tools have two or three of the above-mentioned functions. Cable termination is required e.g. for connecting a cable or a wire to power, coaxial, fibre-optic or modular connectors.

When crimping, a terminal, i.e. a connector, a ferrule, a contact or a similar device, is mechanically secured to a cable, e.g. to a conductor such as a wire, by deformation so that a solid joint having reliable mechanical and/or electrical connection is formed. The crimping operation resulting in a crimped joint may e.g. be performed using crimping dies which e.g. are held by a hand-operated crimping tool.

When crimping a terminal to a cable end, a locator may be used to hold the terminal while crimping. The locator may comprise at least one cavity configured to hold the terminal which is to be crimped to a cable end.

SUMMARY OF THE INVENTION

The inventors of the present invention have identified a need for improvements when it comes to crimping workpieces, more precisely, improvements of the locator holding the terminal to be crimped.

An object of the present invention is thus to improve the crimping of elongated workpieces.

A further object of the present invention is to improve the holder which holds the terminal to be crimped.

The above-mentioned objects of the present invention are attained by providing an apparatus for holding at least one elongated workpiece to be crimped. The apparatus comprises a holder frame, a guide member and a locator element. The locator element has at least one holder surface which defines an elongated cavity for receiving and holding the workpiece. The holder frame is arranged to hold the guide member and the locator element. The at least one elongated cavity has a longitudinal main extension. The locator element is movable in a first guide of the holder frame and is movable in relation to the holder frame substantially in the direction of the longitudinal main extension. The guide member is movable in a second guide of the holder frame and is movable in relation to the holder frame and in relation to the locator element. The guide member is movable in a direction substantially perpendicular to the direction of the longitudinal main extension. Further, the guide member and the locator element are slidably engaged with one another. The guide member, when being moved in a direction substantially perpendicular to the direction of the longitudinal main extension, is configured to move the locator element substantially in the direction of the longitudinal main extension, whereby the position of each elongated cavity is adjusted in relation to the holder frame in the direction of the longitudinal main extension.

Hereby, an efficient and precise adjustment of the locator element and each elongated cavity, in relation to the holder frame in the direction of the longitudinal main extension, is provided. An improved locator is attained, and the crimping of elongated workpieces is improved.

According to an advantageous embodiment of the apparatus according to the present invention, the locator element extends in a first main extension plane, and the guide member extends in a second main extension plane which is substantially parallel to the first extension plane. Further, the guide member is movable in the second guide in a direction of the second main extension plane. The locator element may be movable in a direction of the first main extension plane. By this embodiment, the guide member is guided by the second guide in an efficient manner. An improved locator is attained, and the crimping of elongated workpieces is improved.

According to another advantageous embodiment of the apparatus according to the present invention, the locator element has an engaging surface which engages with the guide member, and the engaging surface of locator element is substantially perpendicular to the first main extension plane and forms an angle with a plane that is perpendicular to the direction of the longitudinal main extension. By this embodiment, the guide member and the locator element are efficiently moved in relation to one another, whereby an advantageous movement and positioning of the locator element are attained. The guide member is also guided in the second guide in an efficient manner. Hereby, an improved locator is attained, and the crimping of elongated workpieces is improved.

According to a further advantageous embodiment of the apparatus according to the present invention, the guide member has an engaging surface which engages with the locator element, and the engaging surface of the guide member is substantially perpendicular to the second main extension plane and forms an angle with a plane that is perpendicular to the direction of the longitudinal main extension. By this embodiment, the guide member and the locator element are efficiently moved in relation to one another, whereby an advantageous movement and positioning of the locator element are attained. The guide member is also guided in the second guide in an efficient manner. Hereby, an improved locator is achieved, and the crimping of elongated workpieces is improved.

According to yet another advantageous embodiment of the apparatus according to the present invention, the guide member, when being moved in the second guide in a direction of the second main extension plane and in a direction substantially perpendicular to the direction of the longitudinal main extension, is configured to move the locator element substantially in the direction of the longitudinal main extension. By this embodiment, an advantageous and efficient guidance of the guide member in relation to the holder frame is provided. Hereby, an improved locator is attained, and the crimping of elongated workpieces is improved.

According to still another advantageous embodiment of the apparatus according to the present invention, the apparatus comprises at least one resilient member, the holder frame being arranged to hold the at least one resilient member, and the at least one resilient member is configured to press the locator element toward the guide member, e.g. in the direction of the longitudinal main extension. By this embodiment, an advantageous and efficient guidance and control of the guide member and the locator element in relation to one another are attained. Hereby, an improved locator is attained, and the crimping of elongated workpieces is improved.

According to an advantageous embodiment of the apparatus according to the present invention, the guide member is movable in the second guide between a first end position and a second end position. By this embodiment, an advantageous guidance of the guide member in relation to the locator element is attained. Hereby, an improved locator is attained, and the crimping of elongated workpieces is improved.

According to a further advantageous embodiment of the apparatus according to the present invention, the locator element is movable in the first guide between a first end position and a second end position. By this embodiment, an advantageous guidance of the locator element in relation to the guide member is attained. Hereby, an improved locator is provided, and the crimping of elongated workpieces is improved.

According to another advantageous embodiment of the apparatus according to the present invention, the apparatus comprises a guide element movable in relation to the holder frame, and the guide element is configured to move the guide member in the second guide. By this embodiment, an advantageous guidance and control of the guide member are attained. Hereby, an improved locator is attained, and the crimping of elongated workpieces is improved.

According to yet another advantageous embodiment of the apparatus according to the present invention, the guide element is threaded and movable in relation to the guide member, and the threads or thread of the guide element engage/-s with at least one mating thread of the holder frame. By this embodiment, an efficient guidance and control of the guide member are attained. Hereby, an improved locator is attained, and the crimping of elongated workpieces is improved.

According to still another advantageous embodiment of the apparatus according to the present invention, the guide element is threaded and movable in relation to the guide member, and in that the thread or threads of the guide element engage/-s with at least one protrusion, e.g. a plurality of protrusions, provided on the guide member. By this embodiment, an advantageous guidance and control of the guide member are attained. Hereby, an improved locator is attained, and the crimping of elongated workpieces is improved.

According to an advantageous embodiment of the apparatus according to the present invention, the guide member is situated between the guide element and the locator element. This location of the guide element and the guide member saves space in the locator and provides an efficient control of the guide member and consequently of the locator element. Hereby, an improved locator is provided, and the crimping of elongated workpieces is improved.

According to a further advantageous embodiment of the apparatus according to the present invention, the holder frame is arranged to hold the threaded guide element. Hereby, an improved locator is achieved, and the crimping of elongated workpieces is improved.

According to another advantageous embodiment of the apparatus according to the present invention, the holder frame comprises a depression for holding the threaded guide element. Hereby, an improved locator is attained, and the crimping of elongated workpieces is improved.

According to yet another advantageous embodiment of the apparatus according to the present invention, the apparatus comprises a cover which is attached to the holder frame and covers at least the guide member and at least partly the locator element. The cover protects moving parts of the apparatus, and the cover can assist in positioning the cable to be crimped with the terminal. Hereby, an improved locator is attained, and the crimping of elongated workpieces is improved.

According to a further advantageous embodiment of the apparatus according to the present invention, the inside of the cover has a stop which prevents the locator element from leaving the first guide. By this embodiment, crimped workpieces can be pulled from the cavities without risking to pull out the locator element from the first guide, or without risking to put too much strain on the resilient member. Hereby, an improved locator is attained, and the crimping of elongated workpieces is improved.

The above-mentioned objects of the present invention are also attained by a crimping tool comprising an apparatus according to any of the above- or below-mentioned embodiments or according to any of the claims 1 to 16 which is attached to the crimping tool.

The above-mentioned objects of the present invention are also attained by a hand-operated crimping tool comprising a tool body and two handles, the handles being movable in relation to each other, wherein the crimping tool comprises an apparatus according to any of the above- or below-mentioned embodiments or according to any of the claims 1 to 16 which is attached to the crimping tool. The positive effects and advantages of the embodiments of the crimping tool correspond to the effects and advantages of the corresponding embodiment of the apparatus.

The above-mentioned features and embodiments of the apparatus and the crimping tools may be combined in various possible ways providing further advantageous embodiments.

Further advantageous embodiments of the apparatus and the hand-operated crimping tool according to the present invention and further advantages with the embodiments of the present invention emerge from the dependent claims and the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF EMBODIMENTS

Figure 1:
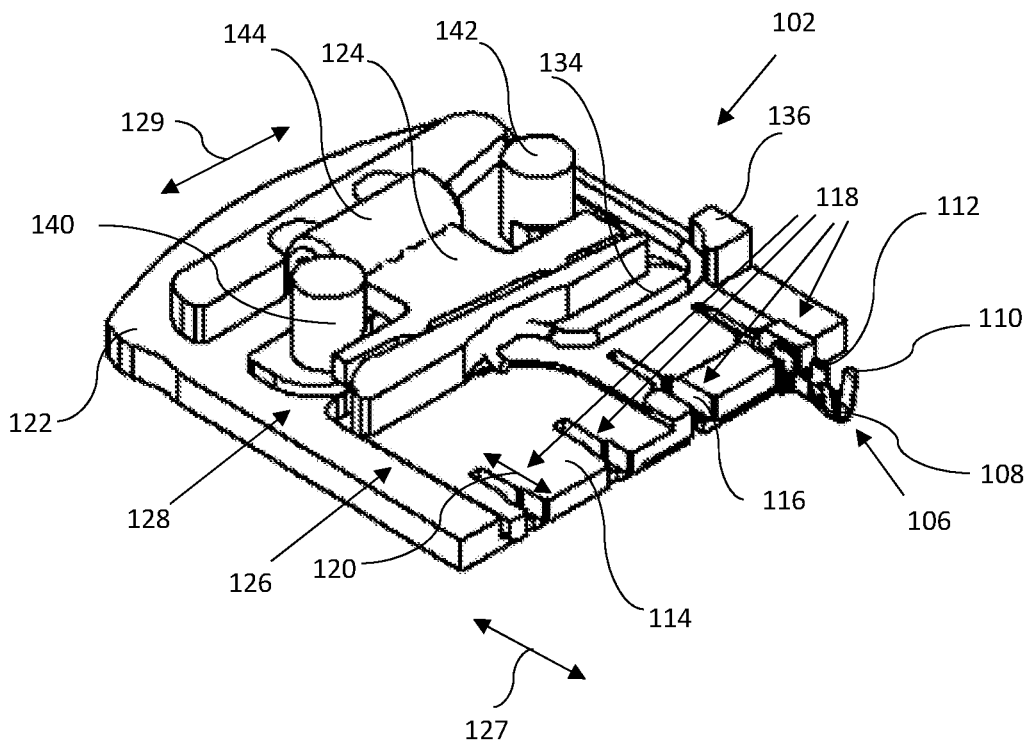
FIG. 1 is a schematic perspective view of an embodiment of the apparatus according to the present invention.
Figure 2:
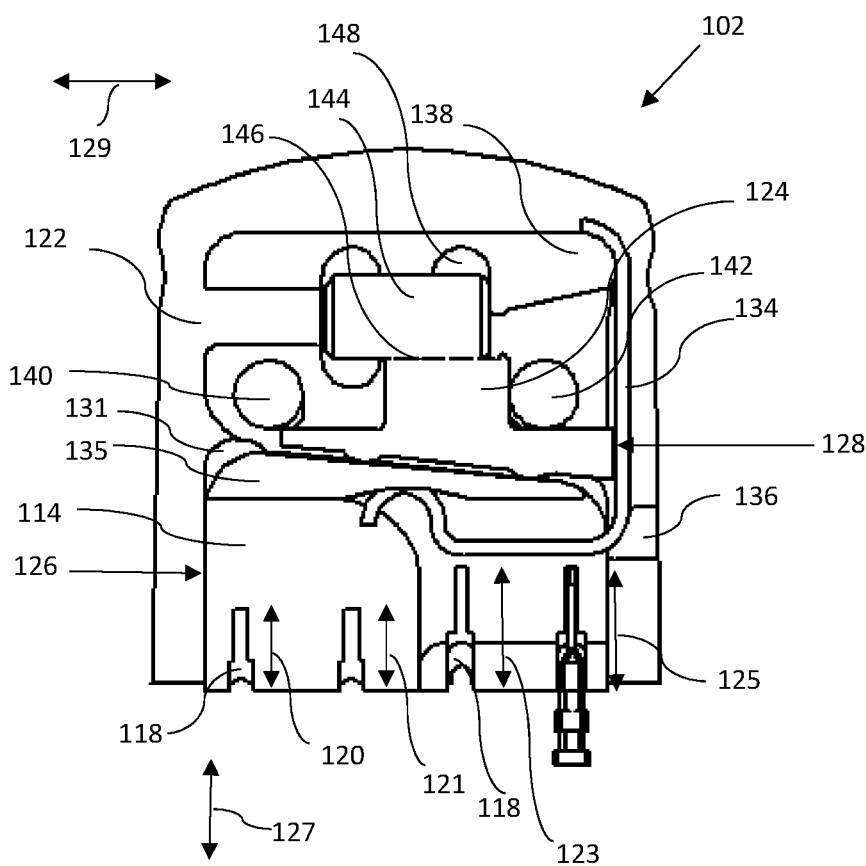
FIG. 2 is a schematic top view of the embodiment of FIG. 1.

FIG. 1 schematically shows aspects of an embodiment of the apparatus 102 according to the present invention. With reference to FIG. 7, the apparatus 102 may include a cover 104. However, for illustrative purposes, the cover 104 is not shown in FIGS. 1 to 6. The apparatus 102 is arranged to hold at least one elongated workpiece 106 to be crimped. In the present embodiment, the workpiece 106 is in the form of a terminal 108, e.g. a connector, a ferrule or a contact. In the present case, the terminal 108 includes a pair of insulation wings 110 and a pair conductor wings 112. It is to be understood that other workpieces can be used with the embodiments of the present invention. To hold each elongated workpiece 106, the apparatus 102 includes a locator element 114 having at least one holder surface 116. The at least one holder surface 116 defines an elongated cavity 118 for receiving and holding the workpiece 106. The at least one elongated cavity 118 has a longitudinal main extension 120. In the present embodiment, the locator element 114 has four holder surfaces 116 each defining an elongated cavity 118. However, the locator element may include fewer or more elongated cavities 118, and each cavity 118 has its own longitudinal main extension 120, 121, 123, 125. With reference to FIG. 2, although the cavities may have different sizes, which is the case in the embodiment in FIGS. 1-2, the longitudinal main extensions 120, 121, 123, 125 of all of the cavities 118 may have essentially the same direction 127. Further, the apparatus 102 includes a holder frame 122 and a guide member 124. The holder frame 122 is arranged to hold the guide member 124 and the locator element 114.

Figure 5:
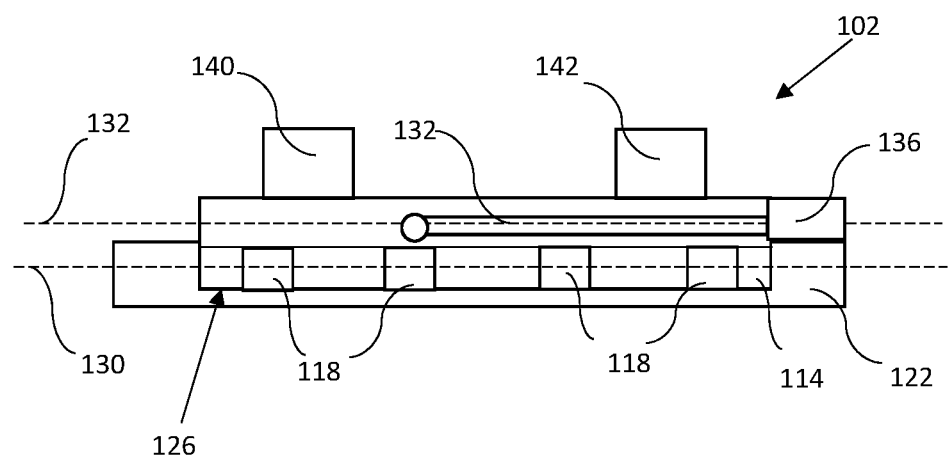
FIG. 5 is schematic front view of the embodiment of FIG. 1.

The locator element 114 is movable in a first guide 126 of the holder frame 122. The locator element 114 is movable in relation to the holder frame 122 and in relation to the guide member 124 in the direction 127 of the longitudinal main extension 120. The guide member 124 is movable in a second guide 128 of the holder frame 122. The guide member 124 is movable in relation to the holder frame 122 and in relation to the locator element 114. The guide member 124 is movable in a direction 129 substantially perpendicular to the direction 127 of the longitudinal main extension 120. With reference to FIG. 5, the locator element 114 extends in a first main extension plane 130. The guide member 124 (not shown in FIG. 5) extends in a second main extension plane 132 which is substantially parallel to the first extension plane 130. The guide member 124 and the locator element 114 are slidably engaged with one another. The guide member 124 and the locator element 114 may be slidably engaged simply by being in contact to one another. Alternatively, the guide member 124 and the locator element 114 may be slidably engaged by including complementary guide means, e.g. a groove and a protrusion complementary to the groove. According to the present embodiment, additionally, the guide member 124 is movable in the second guide 128 in the direction 129 of the second main extension plane 132 (see FIG. 5). The locator element 114 may be movable in a direction of the first main extension plane 130. The guide member 124, when being moved in the direction 129 substantially perpendicular to the direction 127 of the longitudinal main extension 120, is configured to move the locator element 114 in the direction of the longitudinal main extension 120. More specifically, the guide member 124, when being moved in the second guide 128 in the direction 129 of the second main extension plane 132 and in the direction 129 substantially perpendicular to the direction 127 of the longitudinal main extension 120, is configured to move the locator element 114 in the direction 127 of the longitudinal main extension 120. The apparatus 102 includes at least one resilient member 134, and the holder frame 122 is arranged to hold the resilient member 134. The resilient member 134 is configured to press, e.g. to push, the locator element 114 toward the guide member 124 in the direction 127 of the longitudinal main extension 120. The locator element 114 includes a locator wall 135 against which the resilient member 134 presses. With reference to FIGS. 1 and 2, the resilient member 134 is supported by a first element 136 of the holder frame 122 and by a second element 138 of the holder frame 122. However, it is to be understood that the resilient member may be designed in various ways.

Figure 3:
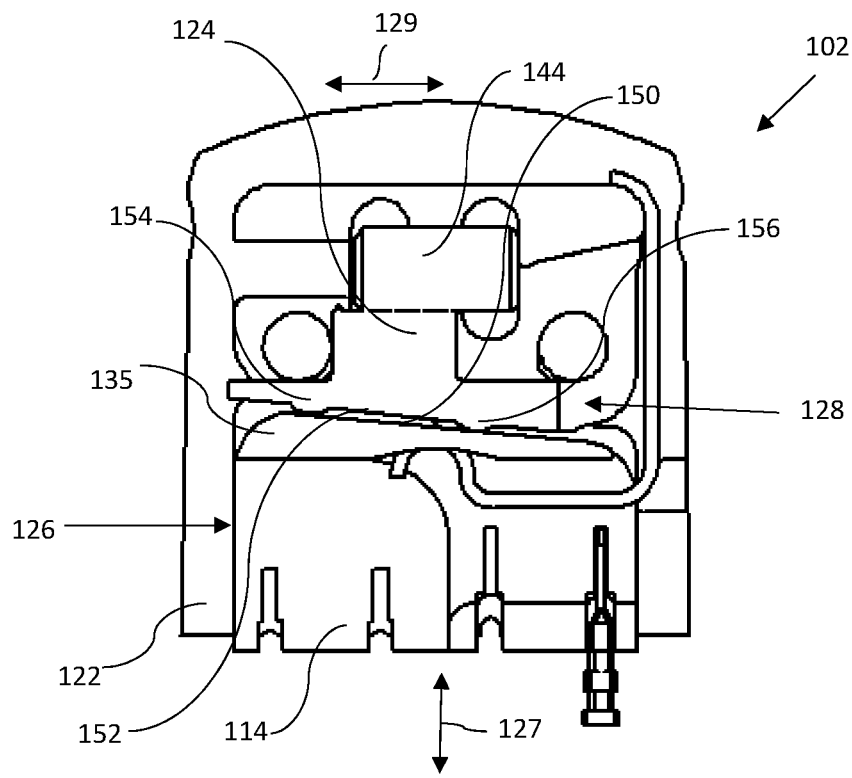
FIG. 3 is a schematic top view of the embodiment of FIG. 1.

With reference to FIGS. 2 and 3 and as mentioned above, the holder frame 122 includes the first guide 126 to guide the locator element 114. The first guide 126 is in the form of a recess 131 which is complementary to the locator element 114. The holder frame 122 includes the second guide 128 to guide the guide member 124. The second guide 128 comprises two cylinders 140, 142. In the present embodiments, the two cylinders 140, 142 are circular-cylindrical. However, other shapes are possible. The apparatus 102 may comprise a guide element 144 movable in relation to the holder frame 122. The guide element 144 is also configured to move the guide member 124 in the second guide 128. The guide element 144 may be threaded and movable in relation to the guide member 124. The threads or thread of the guide element 144 engage/-s with at least one protrusion 146, e.g. a plurality of protrusions, provided on the guide member 124. The guide member 124 is situated between the guide element 144 and the locator element 114. The holder frame 122 is arranged to hold the threaded guide element 144 by including a depression 148 for holding the threaded guide element 144.

The guide member 124 is movable in the second guide 128 between a first end position and a second end position in relation to the holder frame 122. In FIG. 2, the guide member 124 is in its first end position, to the right in FIG. 2. The locator element 114 is movable in the first guide 126 between a first end position and a second end position in relation to the holder frame 122. In FIG. 2 the locator element 114 is in its first position, its retracted position. In FIG. 3, the guide member 124 is in its second end position, to the left in FIG. 3, and has moved the locator element 114 away from the guide element 144. In FIG. 3 the locator element 114 is in its second position, its protruding position. The movement of the locator element 114 in relation to the holder frame 122 is caused by the movement of the guide member 124 in the second guide 128 between the end positions and caused by the resilient member 134 which is configured to press the locator element 114 toward the guide member 124, or in the direction toward the guide element 144. When the guide member 124 is moved to toward the first end position (to the right), the resilient member 134 pushes the locator element 114 toward its first or retracted position. When the guide member 124 is moved to toward the second end position (to the left), the guide member 124 pushes the locator element 114 toward its protruding or second position.

With reference to FIG. 3, the locator element 114 has an engaging surface 150 which engages with the guide member 124. The engaging surface 150 of the locator element 114 may be provided on the above-mentioned locator wall 135 of the locator element 114. The engaging surface 150 of the locator element 114 is substantially perpendicular to the first main extension plane 130 (see FIG. 5) and forms an angle with a plane that is perpendicular to the direction 127 of the longitudinal main extension 120. Alternatively or additionally, the guide member 124 may have an engaging surface 152 which engages with the locator element 114. The engaging surface 152 of the guide member 124 may be substantially perpendicular to the second main extension plane 132 (see FIG. 5) and forms an angle with a plane that is perpendicular to the direction 127 of the longitudinal main extension 120. In the present embodiment, the engaging surface 152 of the guide member 124 has two projections 154,156 abutting against the engaging surface 150 of the locator element 114. Alternatively, the engaging surface 150 of the locator element 114 could include one or two projections. Each engaging surface 150, 152 could have one, two or more than two projections. Each engaging surface 150, 152 can be flat or even without any projections, which is the case for the engaging surface 150 of the locator element 114 according to the shown embodiment.

The combination of the threaded guide element 144 and the engaging surface 150 of the locator element 114 and the engaging surface 152 of the guide member 124 provides a precise adjustment of the locator element 114 and consequently a precise adjustment of the elongated cavities 118 in the direction 127 of the longitudinal main extension 120 and in relation to the holder frame 122 and the cover 104 (see FIG. 7).

Figure 4:
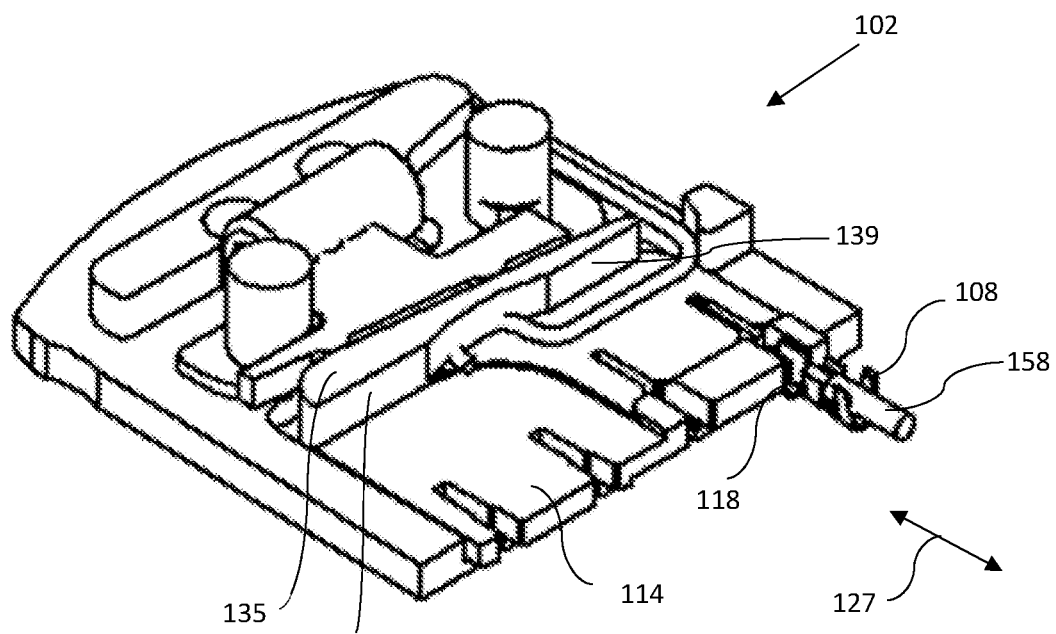
FIG. 4 is a schematic perspective view of the embodiment of FIG. 1.

In FIG. 4, a cut-away view of a cable 158 to be crimped is illustrated. The cable 158 to be crimped is simply placed in the terminal 108, which is held by the cavity 118. The locator element 114 and the cover 104 may assist in positioning the cable 158 into a suitable position for crimping.

FIG. 5 is a front view as seen into the cavities 118 and schematically illustrates the first main extension plane 130 of the locator element 114 and the second main extension plane 132 of the guide member 124 (not shown in FIG. 5). The first main extension plane 130 is substantially parallel to the second main extension plane 132.

By "substantially" in the context of "substantially parallel" is meant that the plane in question is essentially parallel to another plane, but that there may be a deviation or difference of a few degrees. By "substantially" in the context of "substantially perpendicular" is meant that the plane in question is essentially perpendicular to another plane or to a direction, but that there may be a deviation or difference of a few degrees (e.g. at maximum ±10, ±5, or ±2 degrees) from the right angle (90 degrees).

Figure 6:
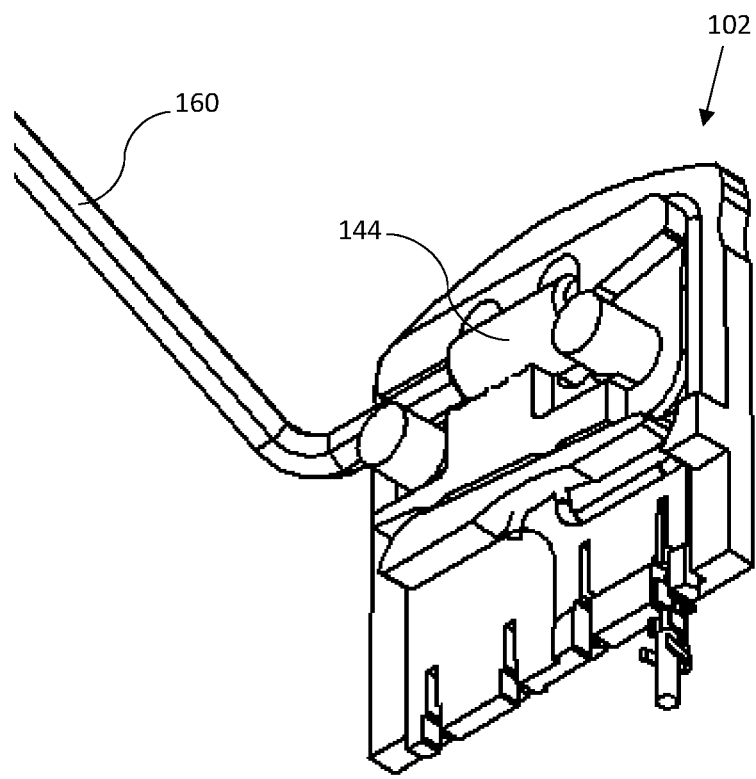
FIG. 6 is a schematic perspective view of the embodiment of FIG. 1.
Figure 7:
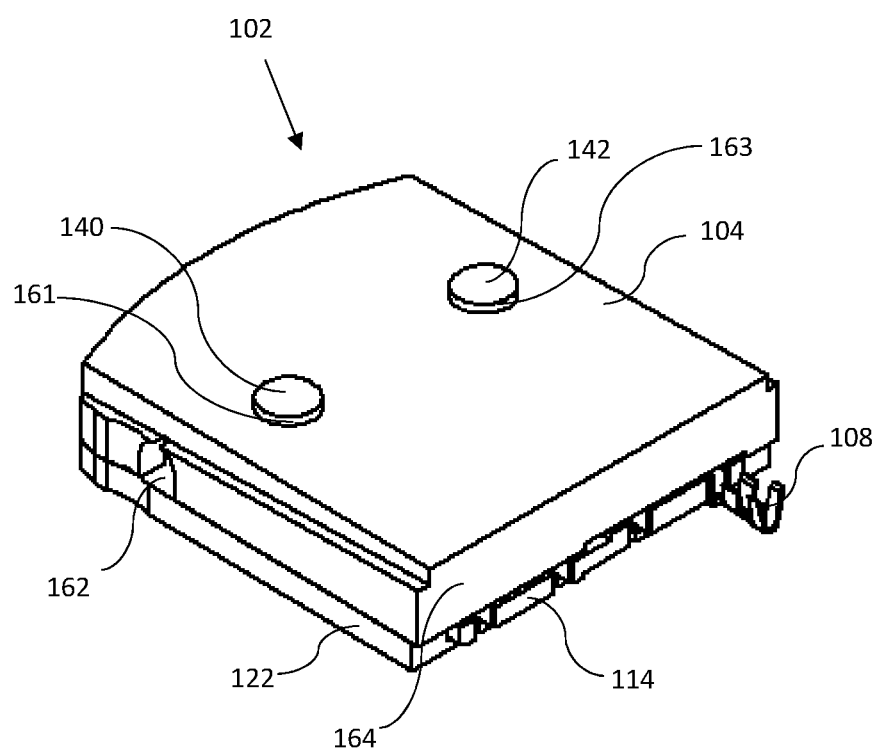
FIG. 7 is a schematic perspective view of the embodiment of FIG. 1.

FIG. 6 schematically illustrates how the guide element 144 can be operated and rotated by a hex key 160, whereby the guide member 124 is moved. Thus, in the present embodiment, the guide element 144 has a hexagonal socket configured to receive the hex key 160. However, it is to be understood that the guide element may be operated in other ways.

FIG. 7 schematically illustrates an embodiment of the apparatus with a cover 104 which is attached to the holder frame 122 and covers at least the guide member and at least partly the locator element 114. The two cylinders 140, 142 projects through the cover 104 via a respective opening 161, 163. On the side of the cover 104, an opening 162 is provided for the hex key 160. When a cable end is to be put into the terminal 108, the front side 164 of the cover 104 may assist in positioning the cable into a suitable position for crimping.

Figure 8:
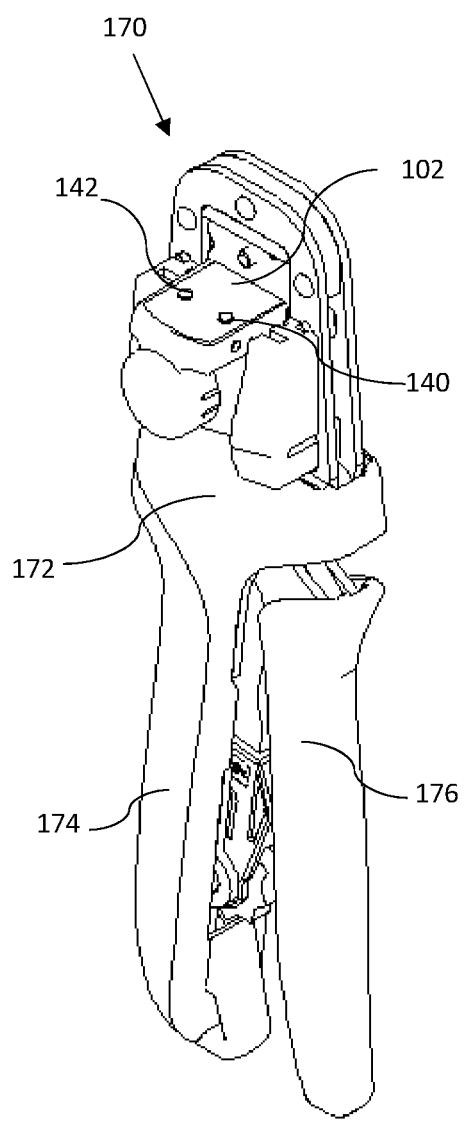
FIG. 8 is a schematic perspective view of an embodiment of the crimping tool according to the present invention.
Figure 9:
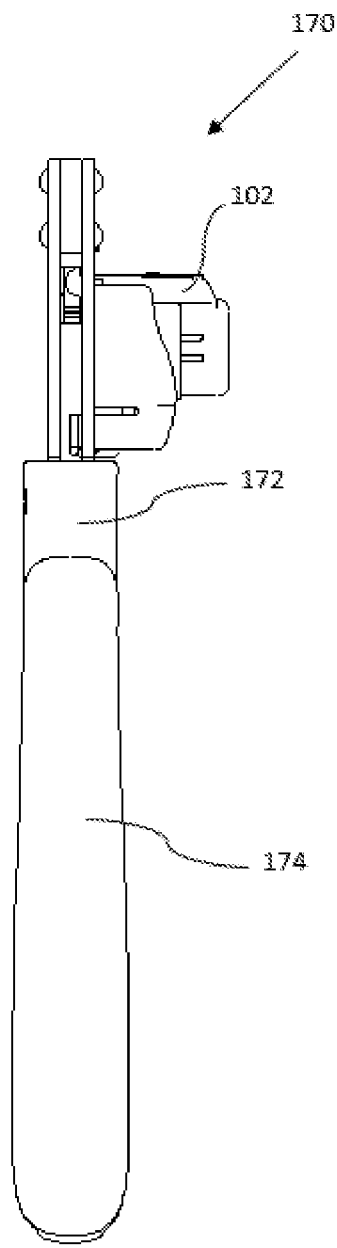
FIG. 9 is a side view of the crimping tool of FIG. 8.

With reference to FIGS. 8 and 9, an embodiment of a hand-operated crimping tool 170 according to the present invention is schematically illustrated. The crimping tool 170 includes a tool body 172 and two handles 174, 176. The handles 174, 176 are movable in relation to one another. The crimping tool 170 may include any one of the embodiments of the apparatus 102 disclosed above. The apparatus 102 is attached to the crimping tool 170, e.g. to the tool body 172, e.g. as shown in FIGS. 8 and 9.

Figure 10:
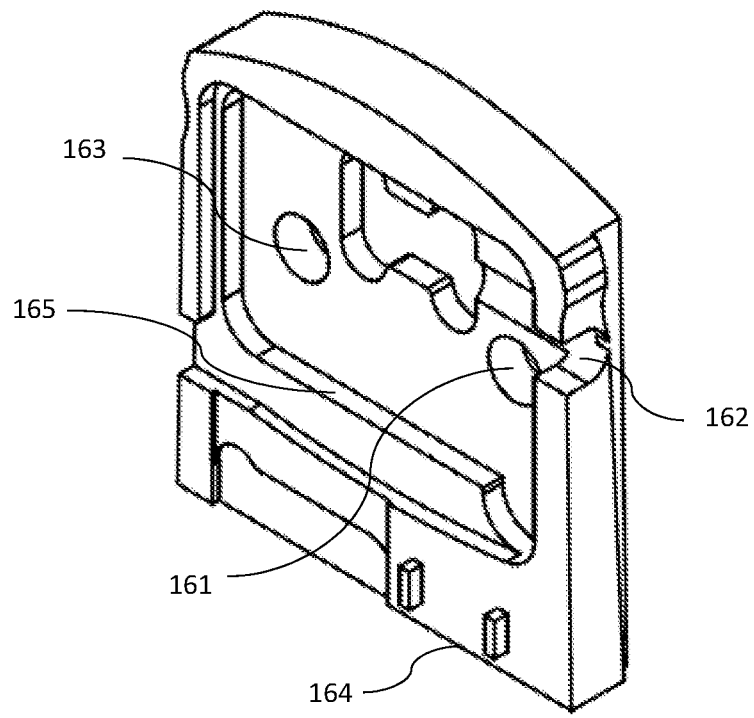
FIG. 10 is a perspective view of the inside of the cover of FIG. 7.
Figure 11:
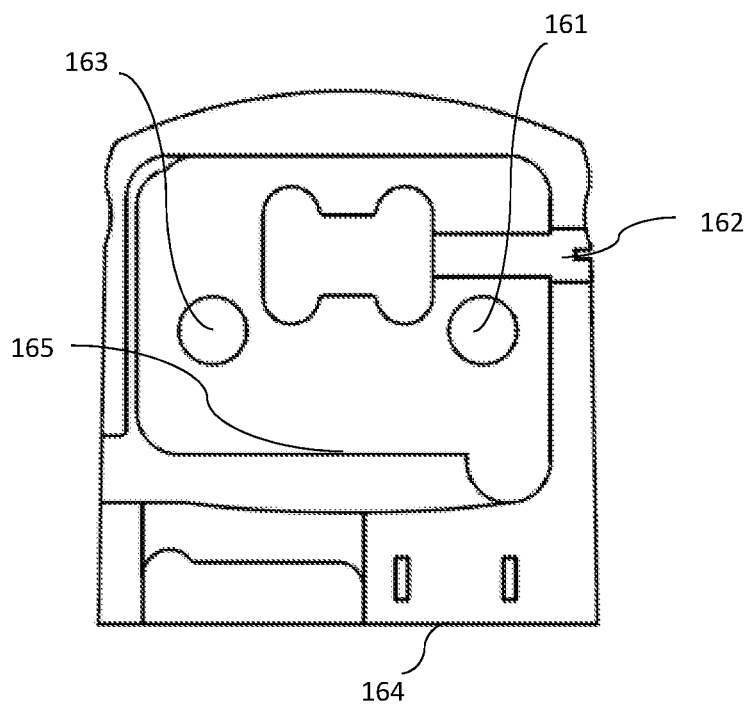
FIG. 11 is a view of the inside of the cover of FIG. 7.

FIGS. 10 and 11 illustrate aspects of the inside of the cover 104 of FIG. 7. In addition to the resilient member 134, the apparatus 102 may be provided with additional means for preventing the locator element 114 from leaving its recess 131, especially when the crimped workpiece 106, e.g. the terminal 108 and cable 158, is pulled from the elongated cavity 118 after crimping. As disclosed above, the locator element 114 includes a locator wall 135. The locator wall 135 has a greater height than the rest of the locator element 114. With reference to FIG. 4, the locator wall 135 may have two surfaces 137, 139 which face the cavities 118. On the inside (in the ceiling), the cover 104 includes a stop 165 which prevents the locator wall 135 from passing on its way toward the front side 164 of the cover 104, and thus prevents the locator element 114 from leaving the recess 131 and thus from leaving the first guide 126. Specifically, it may be at least one of the above-mentioned two surfaces 137 and 139 of the locator wall 135 that comes into contact with the stop 165 to prevent the locator wall 135 from passing. It is to be understood that other means for preventing the locator element 114 from leaving its recess 131 may be provided. In some cases, the resilient member 134 per se may be enough.

The parts of the apparatus 102 may e.g. be made of plastic or metal, or any other suitable material. The features of the different embodiments of the apparatus and crimping tool, respectively, disclosed above may be combined in various possible ways providing further advantageous embodiments.

The invention shall not be considered limited to the embodiments illustrated, but can be modified and altered in many ways by one skilled in the art, without departing from the scope of the appended claims.

The invention claimed is:

1. An apparatus (102) for holding at least one elongated workpiece (106) to be crimped, wherein the apparatus comprises:

a holder frame (122), a guide member (124) and a locator element (114) having at least one holder surface (116) each defining an elongated cavity (118) for receiving and holding the workpiece, wherein the holder frame (122) is arranged to hold the guide member and the locator element, the at least one elongated cavity (118) having a longitudinal main extension (120) extending in a direction of the at least one elongated cavity (118), wherein the locator element (114) is movable in a first guide (126) of the holder frame and is movable in relation to the holder frame substantially in the direction (127) of the longitudinal main extensions (120), wherein the guide member (124) is movable in a second guide (128) of the holder frame and is movable in relation to the holder frame and in relation to the locator element in a direction (129) substantially perpendicular to the direction (127) of the longitudinal main extension (120), wherein the guide member (124) and the locator element (114) are slidably engaged with one another, and wherein the guide member (124), when being moved in the direction (129) substantially perpendicular to the direction (127) of the longitudinal main extension (120), is configured to move the locator element (114) substantially in the direction (127) of the longitudinal main extension (120), whereby the position of each of the at least one elongated cavity (118) is adjusted in relation to the holder frame (122) in the direction (127) of the longitudinal main extension (120).

2. An apparatus (102) according to claim 1, wherein the locator element (114) extends in a first main extension plane (130), the guide member (124) extends in a second main extension plane (132) which is substantially parallel to the first extension plane, and the guide member (124) is movable in the second guide (128) in a direction (129) of the second main extension plane.

3. An apparatus (102) according to claim 2, wherein the locator element (114) has an engaging surface (150) which engages with the guide member (124), and the engaging surface (150) of the locator element is substantially perpendicular to the first main extension plane (130) and forms an angle with a plane that is perpendicular to the direction (127) of the longitudinal main extension (120).

4. An apparatus (102) according to claim 3, wherein the guide member (124) has an engaging surface (152) which engages with the locator element (114), and the engaging surface (152) of the guide member is substantially perpendicular to the second main extension plane (132) and forms an angle with a plane that is perpendicular to the direction (127) of the longitudinal main extension (120).

5. An apparatus (102) according to claim 2, wherein the guide member (124) has an engaging surface (152) which engages with the locator element (114), and the engaging surface (152) of the guide member is substantially perpendicular to the second main extension plane (132) and forms an angle with a plane that is perpendicular to the direction (127) of the longitudinal main extension (120).

6. An apparatus (102) according to claim 2, wherein the guide member (124) when being moved in the second guide (128) in a direction (129) of the second main extension plane and in the direction (129) substantially perpendicular to the direction (127) of the longitudinal main extension (120) is configured to move the locator element (114) substantially in the direction (127) of the longitudinal main extension (120).

7. An apparatus (102) according to claim 1, wherein the apparatus comprises at least one resilient member (134), the holder frame (122) being arranged to hold the at least one resilient member, and the at least one resilient member is configured to press the locator (114) element toward the guide member (124).

8. An apparatus (102) according to claim 1, wherein the guide member (124) is movable in the second guide (128) between a first end position and a second end position.

9. An apparatus (102) according to claim 1, wherein the locator element (114) is movable in the first guide (126) between a first end position and a second end position.

10. An apparatus (182) according to claim 1, wherein the apparatus comprises a guide element (144) movable in relation to the holder frame (122), and the guide element (144) is configured to move the guide member (124) in the second guide (128).

11. An apparatus according to claim 10, wherein the guide element is threaded with threads or a thread and movable in relation to the guide member, and in that the threads or thread of the guide element engages with at least one mating thread of the holder frame.

12. An apparatus (102) according to claim 11, wherein the holder frame (122) is arranged to hold the threaded guide element (144).

13. An apparatus (102) according to claim 12, wherein the holder frame (122) comprises a depression (146) for holding the threaded guide element (144).

14. An apparatus (102) according to claim 10, wherein the guide element (144) is threaded and movable in relation to the guide member (124), and the threads or thread of the guide element (144) engages with at least one protrusion (146) provided on the guide member (124).

15. An apparatus (102) according to claims 14, wherein the guide member (124) is situated between the guide element (144) and the locator element (114).

16. An apparatus (102) according to claim 14, wherein the holder frame (122) is arranged to hold the threaded guide element (144).

17. An apparatus (102) according to claim 1, wherein the apparatus comprises a cover (104) which is attached to the holder frame (122) and covers the guide member (124) and at least partly covers the locator element (114).

18. An apparatus (102) according to claim 17, wherein an inside of the cover (104) has a stop (165) which prevents the locator element (114) from leaving the first guide (126).

19. A crimping tool comprising:
an apparatus (102) according to claim 1, which is attached to the crimping tool.

20. A hand-operated crimping tool (170) comprising:
a tool body (172) and two handles (174, 176), the handles being movable in relation to each other, wherein the crimping tool comprises an apparatus (102) according to claim 1, which is attached to the crimping tool.

* * * * *